United States Patent
Lin et al.

(10) Patent No.: US 9,825,882 B2
(45) Date of Patent: Nov. 21, 2017

(54) METHODS FOR AN AUTOMATIC SCALING OF DATA CONSUMERS AND APPARATUSES USING THE SAME

(71) Applicant: Acer Incorporated, New Taipei (TW)

(72) Inventors: Hsing-Wei Lin, New Taipei (TW); Jung-Hsuan Fan, New Taipei (TW)

(73) Assignee: ACER INCORPORATED, New Taipei (TW)

(*) Notice: Subject to any disclaimer, the term of this patent is extended or adjusted under 35 U.S.C. 154(b) by 143 days.

(21) Appl. No.: 14/828,811

(22) Filed: Aug. 18, 2015

(65) Prior Publication Data
US 2016/0352649 A1 Dec. 1, 2016

(30) Foreign Application Priority Data
May 27, 2015 (TW) .............................. 104116933 A

(51) Int. Cl.
H04L 12/26 (2006.01)
H04L 12/911 (2013.01)
H04L 29/08 (2006.01)
H04L 12/801 (2013.01)
H04L 12/835 (2013.01)

(52) U.S. Cl.
CPC ........ H04L 47/827 (2013.01); H04L 43/0882 (2013.01); H04L 47/127 (2013.01); H04L 47/30 (2013.01); H04L 67/02 (2013.01); H04L 67/22 (2013.01)

(58) Field of Classification Search
None
See application file for complete search history.

(56) References Cited

U.S. PATENT DOCUMENTS

| | | | |
|---|---|---|---|
| 7,330,938 B2 | 2/2008 | Nenov et al. | |
| 7,987,462 B2 | 7/2011 | Follis et al. | |
| 8,336,058 B1 | 12/2012 | Geisinger et al. | |
| 9,444,890 B2* | 9/2016 | DeCusatis | G06F 15/167 |
| 2008/0052429 A1* | 2/2008 | Botchek | G06F 9/3879 710/62 |
| 2013/0290754 A1* | 10/2013 | Zhang | G06F 1/3206 713/320 |
| 2014/0189256 A1* | 7/2014 | Kranich | G06F 9/526 711/147 |
| 2014/0237145 A1* | 8/2014 | Mints | G06F 5/12 710/53 |

OTHER PUBLICATIONS

Chinese language office action dated Jun. 1, 2016, issued in application No. TW 104116933.

* cited by examiner

*Primary Examiner* — Otis L Thompson, Jr.
(74) *Attorney, Agent, or Firm* — McClure, Qualey & Rodack, LLP

(57) ABSTRACT

The invention introduces a method for an automatic scaling of data consumers, performed by a processing unit of a data-consumer server, which contains at least the following steps. State-update requests are received from data consumers, where each state-update request includes a busy state or an idle state and the busy state indicates that the data consumer reads data from a queue and processes the read data. A first quantity of data consumers, a second quantity of busy states and a third quantity of idle states are calculated. A fourth quantity of data consumers to be produced is estimated according to the first, second and third quantities. Data consumers of the fourth quantity are produced.

18 Claims, 5 Drawing Sheets

METHODS FOR AN AUTOMATIC SCALING OF DATA CONSUMERS AND APPARATUSES USING THE SAME

CROSS REFERENCE TO RELATED APPLICATIONS

This Application claims priority of Taiwan Patent Application No. 104116933, filed on May 27, 2015, the entirety of which is incorporated by reference herein.

BACKGROUND

Technical Field

The present invention relates to message processing, and in particular to methods for an automatic scaling of data consumers and apparatuses using the same.

Description of the Related Art

In order to process numerous messages for big data in real time, most systems are equipped with message queues for buffering messages. Message consumers retrieve messages from the message queues and process the retrieved ones in order. The conventional mechanism of message queue retrieval usually employs multiple procedures or threads to query a message queue periodically and, if necessary, retrieve and process the buffered messages. However, it increases the computation cost and the workload of message queues to query message queues frequently. Also, the message retrieval may not follow dramatic changes of the buffered messages of message queues. Thus, it is desirable to have methods for an automatic scaling of data consumers and apparatuses using the same to address the aforementioned problem.

BRIEF SUMMARY

An embodiment of the invention introduces a method for an automatic scaling of data consumers, performed by a processing unit of a data-consumer server, which contains at least the following steps. State-update requests are received from data consumers, where each state-update request includes a busy state or an idle state and the busy state indicates that the data consumer reads data from a queue and processes the read data. A first quantity of data consumers, a second quantity of busy states and a third quantity of idle states are calculated. A fourth quantity of data consumers to be produced is estimated according to the first, second and third quantities. Data consumers of the fourth quantity are produced.

An embodiment of the invention introduces an apparatus for an automatic scaling of data consumers contains at least a processing unit. The processing unit receives state-update requests from data consumers, where each state-update request contains a busy state or an idle state and the busy state indicates that the data consumer reads data from a queue and processes the read data. The processing unit calculates a first quantity of data consumers, a second quantity of busy states and a third quantity of idle states; estimates a fourth quantity of data consumers to be produced according to the first, second and third quantities; and produces data consumers of the fourth quantity.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
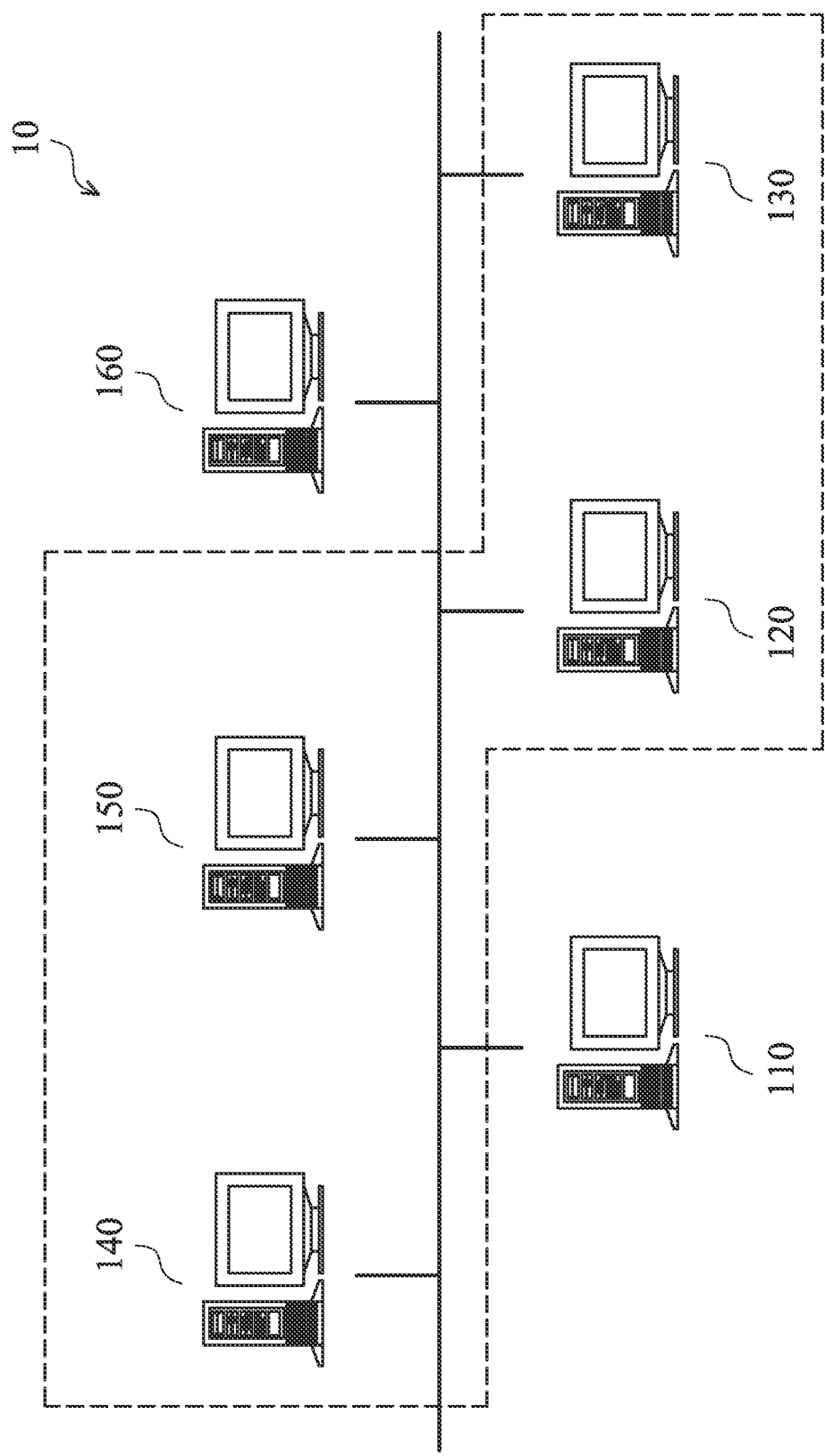
FIG. 1 is a schematic diagram of the network architecture according to an embodiment of the invention.

An embodiment of the invention introduces the network architecture containing multiple servers operating in a distributed computing environment. FIG. 1 is a schematic diagram of the network architecture according to an embodiment of the invention. The server 110 (which may be referred to as a queue server) provides a queue, such as RabbitMQ, AWS SQS, etc. The queue is a data structure used by one or more "message producers" to send data to one or more "data consumers" in an unsynchronized manner. For example, one or more data producers may place data into the queue and one or more data consumers may asynchronously consume (i.e., remove/read) the data. The queue buffers data in an order and utilizes a single permission for the data producers and consumers, such that only one data producer or consumer can access the queue at a time. For example, to insert data into the queue, a data producer may first acquire the permission exclusively of all other data producers and consumers. If there is space in the queue, the data producer may then insert data at the tail of the queue. Otherwise, the data producer will wait until one of the data consumers removes or reads data from the head of the queue, thereby creating space. Servers 120 to 150 (which may be referred to as data-consumer servers) form a cluster and each server includes an automatic scaling module for monitoring processing states of data consumers to increase or decrease data consumers automatically. The automatic scaling module may be practiced in a Web server and respond to the requests by the data consumers using a specified communications protocol, such as an HTTP (HyperText Transfer Protocol), an HTTPS (HTTP Secure), etc. The data consumers may be implemented in different threads of a process. A thread of execution is the smallest unit of processing that can be scheduled by an operating system. A thread is contained inside a process. Multiple threads existing within the same process, such as data consumers, share resources, such as a memory; different processes do not share these resources. Theoretically, the threads of a process share its code and its context (the values that its variables reference at any given moment). The data consumers have no need to communicate with each other but report their processing states to the automatic scaling module independently, thus, they do not share the context for the process, leading to no data dependency being present between the data consumers. Due to the loose coupling between the data consumers, the automatic scaling module can freely increase or decrease data consumers according to the processing states of the executed data consumers. A server 160 (which may be referred to as a load-monitoring server) monitors and analyzes the serving data-consumer servers, and adds an available data-consumer server in the server cluster or removes a data-consumer server therefrom according to the analyzed results. Those skilled in the art realize that the queue server, the data-consumer servers and the load-monitoring server may be practiced in virtual machines and any combination of the aforementioned functionalities of the servers may be implemented in a physical electronic apparatus, and the invention should not be limited thereto.

Figure 2:
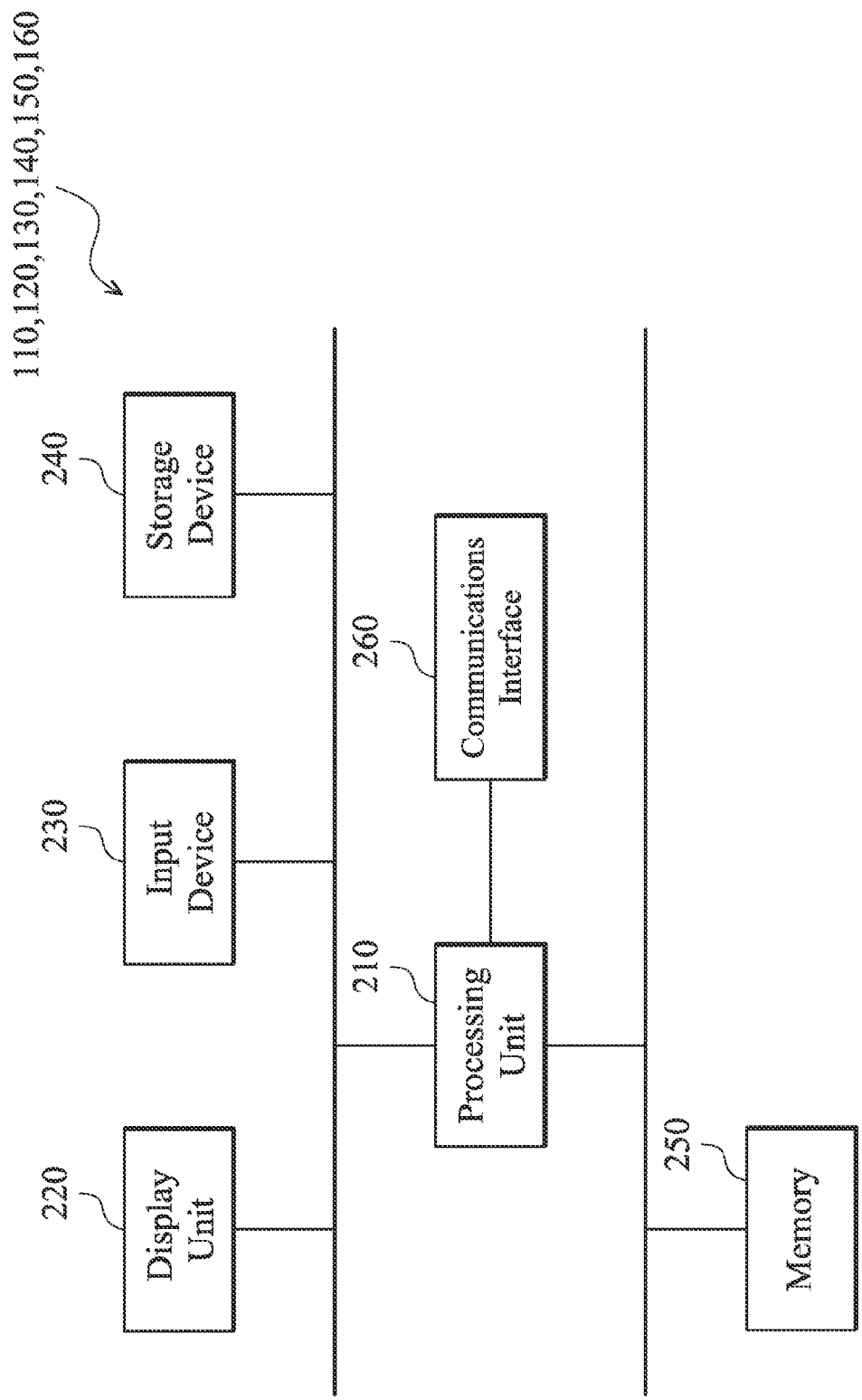
FIG. 2 is the system architecture of a server according to an embodiment of the invention.

FIG. 2 is the system architecture of a server according to an embodiment of the invention. The system architecture may be practiced in any of the queue server 110, the data-consumer servers 120 to 150, and the load-monitoring server 160, at least including a processing unit 210. The processing unit 210 can be implemented in numerous ways, such as with dedicated hardware, or with general-purpose hardware (e.g., a single processor, multiple processors or graphics processing units capable of parallel computations, or others) that is programmed using microcode or software instructions to perform the functions recited herein. The system architecture further includes a memory 250 for storing necessary data in execution, such as variables, data tables, or others, and a storage unit 240 for storing a wide range of electronic files, such as Web pages, documents, video files, audio files, or others. A communications interface 260 is included in the system architecture and the processing unit 210 can communicate with other electronic devices thereby. The communications interface 260 may be a LAN (local area network) communications module, a WLAN (wireless local area network) communications module, or others. The system architecture further includes one or more input devices 230 to receive user input, such as a keyboard, a mouse, a touch panel, or others. A user may press hard keys on the keyboard to input characters, control a mouse pointer on a display by operating the mouse, or control an executed application with one or more gestures made on the touch panel. The gestures include, but are not limited to, a one-click, a double-click, a single-finger drag, and a multiple finger drag. A display unit 220, such as a TFT-LCD (Thin film transistor liquid-crystal display) panel, an OLED (Organic Light-Emitting Diode) panel, or others, may also be included to display input letters, alphanumeric characters and symbols, dragged paths, drawings, or screens provided by an application for a user's viewing.

Figure 3:
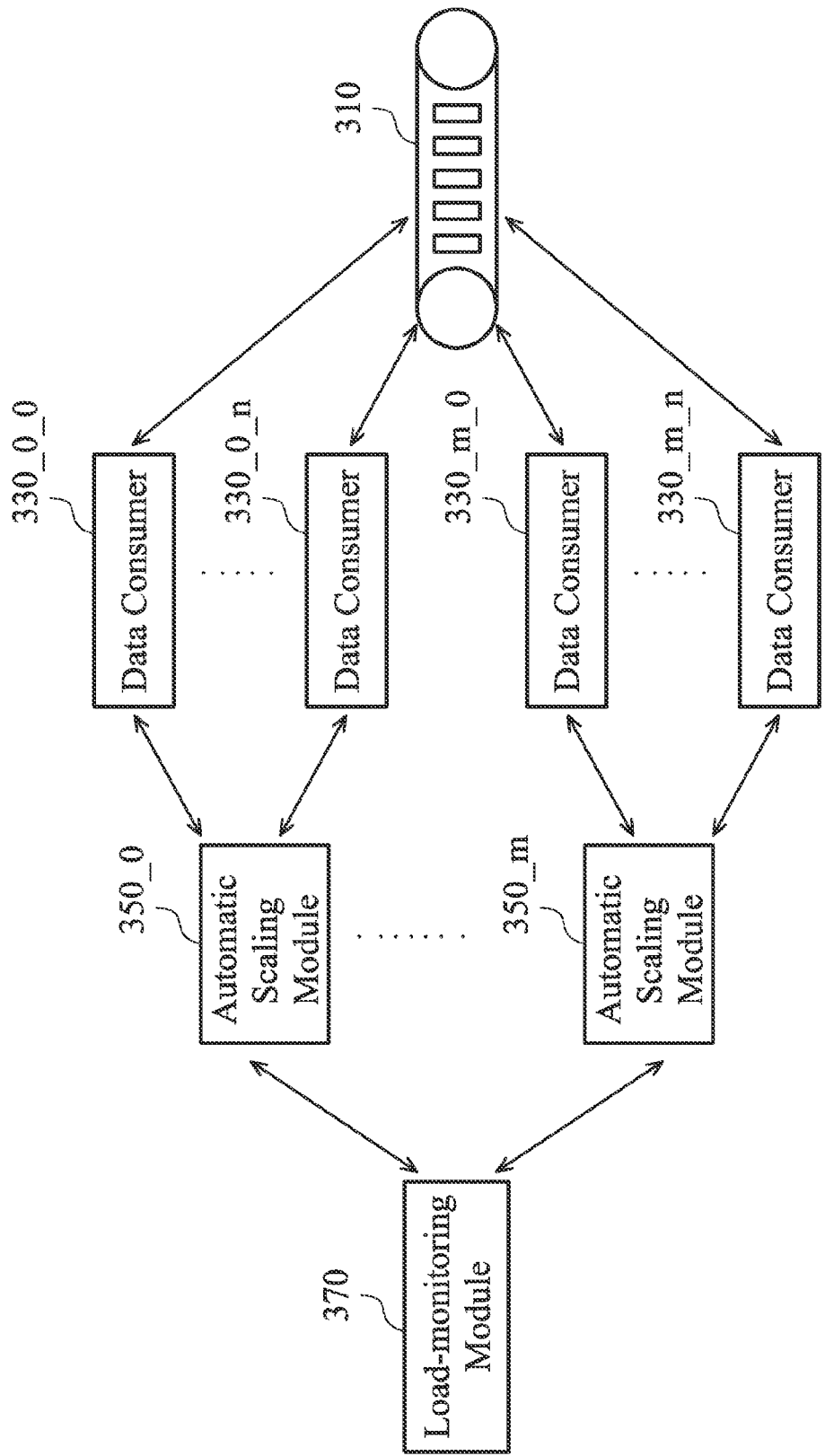
FIG. 3 is a schematic diagram of the software architecture according to an embodiment of the invention.

In some implementations, a software module (which may be a data consumer) may periodically query a queue 310 a total amount of data buffered in the queue 310 and increase or decrease a quantity of data consumers according to the responded results. However, the queue 310 consumes excessive computation for responding to the queries frequently, leading to the system bottleneck. FIG. 3 is a schematic diagram of the software architecture according to an embodiment of the invention. Any of data consumers 330_0_0 to 330_m_n is executed by the processing unit 210 of a data-consumer server. In addition, the processing unit 210 of a data-consumer server loads and executes instructions or program codes of any of the automatic scaling modules 350_0 to 350_m to manage processing states of one or more data consumers. When reading data from the queue 310 and processing the data successfully, the data consumer sends a busy state to the managed automatic scaling module using a communications protocol, such as an HTTP, an HTTPS, etc.; otherwise, the data consumer sends an idle state to the managed automatic scaling module. When receiving a processing state from any of the data consumers, an automatic scaling module (for example, the automatic scaling module 350_0) updates a quantity of received busy states and a quantity of received idle states. The processing unit 210 of the load-monitoring server 160 periodically loads and executes instructions or program codes of a load-monitoring module 370 to poll all automatic scaling modules 350_0 to 350_m of the data-consumer servers so as to know their service capabilities. When receiving a polling from the load-monitoring module 370, an automatic scaling module (for example, the automatic scaling module 350_0 performs an automatic scaling estimation and determines whether the data-consumer server overloads from generating more data consumers to read and process data buffered in the queue 310 according to the estimation results. If so, a message indicating an overloading is replied; otherwise, a message indicating a normal state is replied. When repeatedly receiving messages each indicating an overloading from any of the automatic scaling modules 350_0 to 350_m, the load-monitoring module 370 selects one available data-consumer server and configures the selected one for adding it to the server cluster and providing services.

Figure 4:
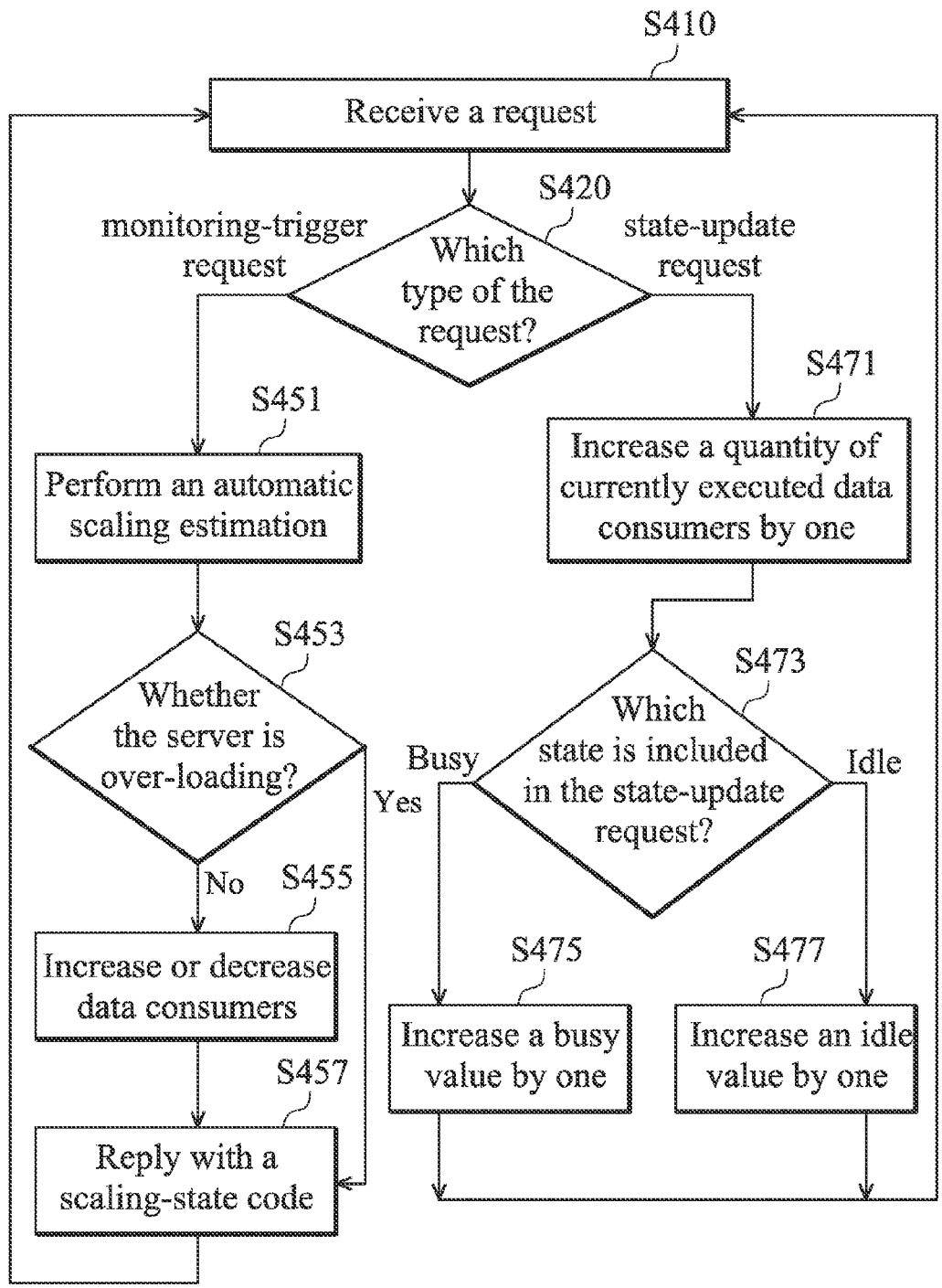
FIG. 4 is a flowchart illustrating a method for automatically scaling data consumers according to an embodiment of the invention.

FIG. 4 is a flowchart illustrating a method for automatically scaling data consumers according to an embodiment of the invention. For example, the method for automatically scaling data consumers is performed when the processing unit 210 of a data-consumer server loads and executes instructions or program codes of the automatic scaling module 350_0. After receiving a request (step S410), it is determined which type of the request has been received (step S420). The request may be sent by an HTTP or an HTTPS. If the received request is a state-update request from any of the data consumers 330_0_0 to 330_0_m (the right path of step S420), a state-update procedure (steps S471 to S477) is performed. If the received request is a monitoring-trigger request from the load-monitoring module 370 (the left path of step S420), an automatic scaling procedure (steps S451 to S457) is performed.

In the state-update procedure, a quantity of currently executed data consumers "current_total_process" is increased by one (step S471), and it is determined which state is included in the state-update request (step S473). If the state indicates a busy state (the left path of step S473), a busy value (busy_process) is increased by one (step S475). If the state indicates an idle state (the right path of step S473), an idle value (idle_process) is increased by one (step S477). The quantity of currently executed data consumers, the busy value and the idle value will be used in the automatic scaling procedure to be described as follows.

In the automatic scaling procedure, an automatic scaling estimation is firstly performed (step S451), and then, it is determined whether the server is over-loading (step S453). If so, a scaling-state code indicating an over-load is replied (step S457); otherwise, data consumers are increased or decreased according to the estimation results (step S455) and a scaling-state code indicating a normal state is replied (S457). In step S451, the automatic scaling estimation estimates a quantity of data consumers to be increased or decreased by referring to the state-update results produced in steps S471 to S477, rather than querying the queue 310 a total amount of data buffered in the queue 310. An exemplary algorithm performed in the automatic scaling procedure is as follows:

```
Input:
    busy_thread //the received busy-state count
    idle_thread //the received idle-state count
    current_total_thread //the total running threads in system
    thread_max //the max threads allowed to be created
Output:
    thread_max
    thread_create_num
Initialize:
    thread_threshold = 5, thread_max_default = 5, thread_max_increase = 1,
thread_max_decrease = 1, thread_create_num_default = 2, thread_upper_limit = 80,
thread_lower_limit = 2
if (busy_thread - idle_thread) >= thread_threshold then
    if idleThread = 0 then
        thread_max = thread_max + thread_max_increase
        if thread_max > thread_upper_limit then
            thread_max = thread_upper_limit
    reset busy_thread and idle_thread to zero
else if idle_thread > 0 or ( current_total_thread = 0 and busy_thread = 0) then
    thread_max = thread_max - thread_max_decrease
    if thread_max < thread_lower_limit then
        thread_max = thread_lower_limit
    reset busy_thread and idle_thread to zero
endif
if current_total_thread < thread_max then
    thread_create_num = floor( thread_max / thread_max_default )
    if thread_create_num > ( thread_max - current_total_thread ) then
        thread_create_num = ( thread_max - current_total_thread )
    else if thread_ create_num < thread_create_num_default then
        thread_create_num = thread_create_num_default
    if ( current_total_thread + thread_create_num ) >= thread_upper_limit then
        return HTTP 503 code (server over-loading)
    else
        return HTTP 200 code (normal)
else
    thread_create_num = 0
    return HTTP 503 code (server over-loading)
endif
```

The parameters of the exemplary algorithm are described in Table 1:

TABLE 1

| Parameters | Description |
|---|---|
| busy_thread | An accumulation of busy states for data consumers |
| idle_thread | An accumulation of idle states for data consumers |
| thread_threshold | A threshold of the difference between busy states and idle states for data consumers |
| thread_max_default | The maximum of data consumers in default |
| thread_max | The maximum of data consumers allowed to be produced |
| thread_max_increase | The maximum of data consumers allowed to be increased |
| thread_max_decrease | The maximum of data consumers allowed to be decreased |
| thread_upper_limit | The upper limit of data consumers |
| thread_lower_limit | The lower limit of data consumers |

TABLE 1-continued

| Parameters | Description |
|---|---|
| thread_create_num | An estimation of data consumers to be generated |
| current_total_thread | A quantity of data consumers currently executed |

Specifically, the algorithm calculates the maximum of data consumers allowed to be produced "thread_max" and an estimation of data consumers to be generated "thread_create_num". If the estimation of data consumers to be generated "thread_create_num" is zero or the quantity of data consumers currently executed "current_total_thread" plus the estimation of data consumers to be generated "thread_create_num" exceeds the upper limit of data consumers "thread_upper_limit", it is indicated that the data-consumer server is too busy to produce further data consumers for reading and processing data buffered in the queue 310 and a message indicating an over-loading "HTTP 503" is replied. If the quantity of data consumers currently executed "current_total_thread" plus the estimation of data consumers to be generated "thread_create_num" does not exceed the upper limit of data consumers "thread_upper_limit", it is indicated that the data-consumer server can produce further data consumers for reading and processing data buffered in the queue 310 and a message indicating a normal state "HTTP 200" is replied.

The following are two use cases for describing operations of the automatic scaling module. Assume that the parameters of the algorithm are set as follows: thread_max_default=5; thread_threshold=5; thread_max_increase=1; thread_max_decrease=1; thread_lower_limit=2; and thread_upper_ limit=80. In the first one, the accumulation of busy states for the data consumers "busy_thread" is 5, the accumulation of idle states for the data consumers "idle_thread" is 0, the maximum of data consumers allowed to be produced "thread_max" is 79 and the quantity of data consumers currently executed "current_total_thread" is 64. When busy_thread minus idle_thread exceeds the threshold of the difference between busy states and idle states for data consumers "thread_threshold", the calculated maximum of data consumers allowed to be produced "thread_max" is 80 and the calculated estimation of data consumers to be generated "thread_create_num" is 16. Subsequently, sixteen data consumers are produced and the message "HTTP 503" is replied to the load-monitoring module 370. In the second one, the accumulation of busy states for the data consumers "busy_thread" is 0, the accumulation of idle states for the data consumers "idle_thread" is 5, the maximum of data consumers allowed to be produced "thread_max" is 20 and the quantity of data consumers currently executed "current_total_thread" is 0. When busy_thread minus idle_thread exceeds the threshold of the difference between busy states and idle states for data consumers "thread_threshold", the calculated maximum of data consumers allowed to be produced "thread_max" is 19 and the calculated estimation of data consumers to be generated "thread_create_num" is 3. Subsequently, three data consumers are produced and the message "HTTP 200" is replied to the load-monitoring module 370.

Figure 5:
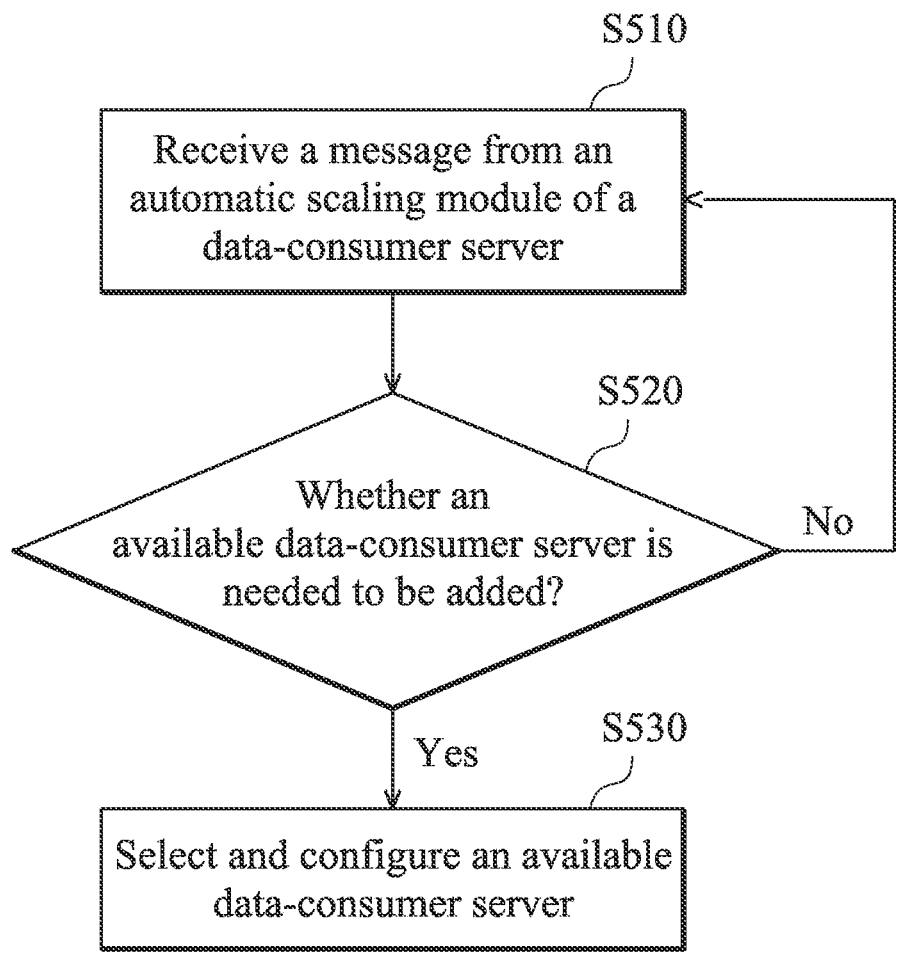
FIG. 5 is a flowchart illustrating a method for managing data-consumer servers according to an embodiment of the invention.

FIG. 5 is a flowchart illustrating a method for managing data-consumer servers according to an embodiment of the invention. After receiving a message from an automatic scaling module of a data-consumer server (step S510), it is determined whether an available data-consumer server needs to be added (step S520). If so, an available data-consumer server is selected and configured for adding the selected one to a server cluster to provide services (step S530). Otherwise, the next message is received from the data-consumer server (step S510). In step S520, specifically, it is determined that an available data-consumer server needs be added when the automatic scaling module repeatedly receives a specified number of messages, each indicating an over-load (for example, five messages).

Although the embodiment has been described as having specific elements in FIG. 2, it should be noted that additional elements may be included to achieve better performance without departing from the spirit of the invention. While the process flows described in FIG. 4 and FIG. 5 each includes a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for an automatic scaling of data consumers, performed by a processing unit of a data-consumer server, comprising:
   receiving a plurality of state-update requests from a plurality of data consumers, wherein each state-update request comprises a busy state or an idle state and the busy state indicates that the data consumer reads data from a queue and processes the read data;
   calculating a first quantity indicating a total number of the state-update requests received from the data consumers, a second quantity indicating a total number of busy states included in the state-update requests and a third quantity indicating a total number of idle states included in the state-update requests;
   estimating a fourth quantity of data consumers according to the first, second and third quantities; and
   increasing or decreasing data consumers according to the fourth quantity.

2. The method of claim 1, wherein the step for calculating a first quantity indicating a total number of the state-update requests received from the data consumers, a second quantity indicating a total number of busy states included in the state-update requests and a third quantity indicating a total number of idle states included in the state-update requests further comprises:
   after receiving each state-update request, increasing the first quantity by one and determining whether the state-update request comprises a busy state or an idle state;
   when the state-update request comprises the busy state, increasing the second quantity by one; and
   when the state-update request comprises the idle state, increasing the third quantity by one.

3. The method of claim 1, wherein the step for estimating a fourth quantity of data consumers according to the first, second and third quantities further comprises:
   after receiving a monitoring-trigger request from a load-monitoring module, estimating the fourth quantity of data consumers according to the first, second and third quantities.

4. The method of claim 3, further comprising:
   obtaining a fifth quantity indicating an upper limit of data consumers;
   determining whether the fourth quantity plus the first quantity exceeds the fifth quantity;
   if so, replying with a first message indicating an over-loading to the load-monitoring module; and
   otherwise, replying with a second message indicating a normal state to the load-monitoring module.

5. The method of claim 4, wherein the load-monitoring module determines whether to add an available data-consumer server to a server cluster according to reception of the first message and the second message.

6. The method of claim 4, wherein the method is performed by a Web server and communicates with the load-monitoring module using an HTTP (HyperText Transfer Protocol) or an HTTPS (HTTP Secure).

7. The method of claim 1, wherein the method is performed by a Web server and communicates with the load-monitoring module using an HTTP (HyperText Transfer Protocol) or an HTTPS (HTTP Secure).

8. The method of claim 1, wherein each data consumer is implemented in a thread and the threads do not share a context.

9. The method of claim 1, wherein the step for calculating a first quantity indicating a total number of the state-update requests received from the data consumers, a second quantity indicating a total number of busy states included in the state-update requests and a third quantity indicating a total number of idle states included in the state-update requests further comprises:

not querying the queue a total amount of data buffered in the queue.

10. An apparatus for an automatic scaling of data consumers, comprising:
- a memory configured to store data in execution; and
- a processing unit, coupled to the memory, receiving a plurality of state-update requests from a plurality of data consumers, wherein each state-update request comprises a busy state or an idle state and the busy state indicates that the data consumer reads data from a queue and processes the read data; calculating a first quantity indicating a total number of the state-update requests received from the data consumers, a second quantity indicating a total number of busy states included in the state-update requests and a third quantity indicating a total number of idle states included in the state-update requests; estimating a fourth quantity of data consumers according to the first, second and third quantities; and increasing or decreasing data consumers according to the fourth quantity.

11. The apparatus of claim 10, wherein the processing unit, after receiving each state-update request, increases the first quantity by one and determines whether the state-update request comprises a busy state or an idle state; when the state-update request comprises the busy state, increases the second quantity by one; and when the state-update request comprises the idle state, increases the third quantity by one.

12. The apparatus of claim 10, wherein the processing unit, after receiving a monitoring-trigger request from a load-monitoring module, estimates the fourth quantity of data consumers according to the first, second and third quantities.

13. The apparatus of claim 12, wherein the processing unit obtains a fifth quantity indicating an upper limit of data consumers; determines whether the fourth quantity plus the first quantity exceeds the fifth quantity; if so, replies with a first message indicating an over-loading to the load-monitoring module; and otherwise, replies with a second message indicating a normal state to the load-monitoring module.

14. The apparatus of claim 13, wherein the load-monitoring module determines whether to add an available data-consumer server to a server cluster according to reception of the first message and the second message.

15. The apparatus of claim 14, wherein the processing unit communicates with the load-monitoring module using an HTTP (HyperText Transfer Protocol) or an HTTPS (HTTP Secure).

16. The apparatus of claim 10, wherein the processing unit communicates with the load-monitoring module using an HTTP (HyperText Transfer Protocol) or an HTTPS (HTTP Secure).

17. The apparatus of claim 10, wherein each data consumer is implemented in a thread and the threads do not share a context.

18. The apparatus of claim 10, wherein the processing unit does not query the queue a total amount of data buffered in the queue.

* * * * *